United States Patent Office 3,113,952
Patented Dec. 10, 1963

3,113,952
1-AMINO-4-THIOCYANO-5-NITROANTHRA-
QUINONE
James M. Straley and Ralph R. Giles, Kingsport, Tenn., assignors to Eastman Kodak Company, Rochester, N.Y., a corporation of New Jersey
No Drawing. Filed Feb. 10, 1958, Ser. No. 714,064
5 Claims. (Cl. 260—378)

This invention relates to a new anthraquinone compound and to a process for its preparation. The invention is also directed to the application of the new anthraquinone to the art of dyeing or coloring.

We have discovered that 1-amino-4-thiocyano-5-nitroanthraquinone yields bright bluish-red dyeings on textile materials formed from a cellulose carboxylic acid ester having 2 to 4 carbon atoms in the acid groups thereof, polyester textile materials, such as polyethylene terephthalate textile materials obtained for example as described in U.S. Patent 2,465,319, patented March 22, 1949, or other polyester textile materials formed from analogous fiber-forming linear polyesters, such as polyesters derived from p-bis-(sulfonyl)-dibenzoic acid and various aliphatic acids and glycols as described in U.S. Patent 2,744,088, patented May 1, 1956, and polyesters derived from various acids, such as terephthalic acid, and 1,4-cyclohexanedimethanol as described in Kibler, Bell and Smith U.S. application Serial No. 554,639, filed December 22, 1955, now U.S. Patent No. 2,901,466. The dyeings obtained have good to excellent fastness to light and gas. Dacron (polyethylene terephthalate) and cellulose acetate are specific illustrations of the textile materials that can be dyed with our new anthraquinone compound.

The new anthraquinone compound of our invention is prepared by monodiazotizing 5-nitro-1,4-diaminoanthraquinone and reacting the diazonium compound thus obtained with thiocyanic acid (HSCN) or a suitable metal salt thereof. Suitable metal thiocyanates include the alkali metal thiocyanates such as potassium thiocyanate and sodium thiocyanate, for example.

The following example illustrates our process and describes how the anthraquinone compound of our invention can be prepared.

*Example 1*

10 grams of 5-nitro-1,4-diaminoanthraquinone were dissolved in 120 cc. of concentrated sulfuric acid. Ice was added slowly at 0°–10° C. with good stirring until a violet floc began to form. The temperature of the reaction mixture was then reduced to −5° C. and 4 grams of sodium nitrite in 7 cc. of water were added while maintaining the reaction temperature below 0° C. After complete addition of the sodium nitrite the reaction mixture was stirred for 1½ hours at about 0° C. The color of the reaction mixture changed to a reddish-brown. The cold reaction mixture was then filtered on glass. The solid collected on the glass was dissolved in 2 liters of water at 40° C. and a small amount of undissolved material was removed by filtration. 4 grams of potassium thiocyanate were added to the clear filtrate and the resulting reaction mixture was heated to boiling and kept at this temperature for 30 minutes. The reaction mixture was filtered while hot and the product (1-amino-4-thiocyano-5-nitroanthraquinone) collected on the filter was washed with hot water. 7.8 grams of 1-amino-4-thiocyano-5-nitroanthraquinone were thus obtained. It dyes Dacron and cellulose acetate textile materials bright bluish-red shades having excellent resistance to the action of light and gas.

By dilution of the original strong sulfuric acid filtrate with water and treatment with potassium thiocyanate a further amount of 1-amino-4-thiocyano-5-nitroanthraquinone can be obtained.

If desired, the 1-amino-4-thiocyano-5-nitroanthraquinone can be obtained in purer form by recrystallization from a solvent therefor, such as methyl Cellosolve, for example.

An equivalent amount of sodium thiocyanate can be used in place of potassium thiocyanate in Example 1.

By cellulose alkyl carboxylic acid esters having two to four carbon atoms in the acid groups thereof, we mean to include, for example both hydrolyzed and unhydrolyzed cellulose acetate, cellulose propionate, cellulose butyrate, cellulose acetate-propionate and cellulose acetate-butyrate.

The new anthraquinone compound of our invention can be used to color the polyester and the cellulose alkyl carboxylic acid ester textile materials mentioned hereinbefore by methods well known to those skilled in the art to which this invention is directed. It may be directly applied to the material undergoing coloration in the form of an aqueous suspension which can be prepared by grinding it to a paste in the presence of a sulfonated oil, soap, sodium lignin sulfonate, or other suitable dispersing agent and dispersing the resulting paste in water.

In the case of cellulose alkyl carboxylic acid ester textile materials direct dyeing operations can, with advantage, be conducted at temperatures of about 70°–90° C., but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation.

While the temperatures given in the dyeing procedure just set forth apply primarily to cellulose alkyl carboxylic acid ester textile materials with the modifications indicated hereinafter this dyeing procedure also applies to the dyeing of polyester textile materials. As understood by those skilled in the dyeing art somewhat higher temperatures than those set forth in the preceding paragraph are ordinarily employed when polyester textile materials, such as Dacron, are being dyed. These latter materials are ordinarily dyed at the boil and usually an assistant, commonly known as a "carrier" is employed. The "carriers" have various active ingredients, such as chlorinated benzenes and o-phenylphenol, for example, in emulsion. Dacronyx is the tradename of an illustrative suitable "carrier."

As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The process of preparing 1-amino-4-thiocyano-5-nitroanthraquinone which comprises monodiazotizing 5-nitro-1,4-diaminoanthraquinone and reacting the diazonium compound thus obtained with a member selected from the group consisting of thiocyanic acid and an alkali metal thiocyanate to form 1-amino-4-thiocyano-5-nitroanthraquinone.

2. The process of preparing 1-amino-4-thiocyano-5-nitroanthraquinone which comprises monodiazotizing 5-nitro-1,4-diaminoanthraquinone and reacting the diazonium compound thus obtained with thiocyanic acid to form 1-amino-4-thiocyano-5-nitroanthraquinone.

3. The process of preparing 1-amino-4-thiocyano-5- nitroanthraquinone which comprises monodiazotizing 5-nitro-1,4-diaminoanthraquinone and reacting the diazonium compound thus obtained with an alkali metal thiocyanate to form 1-amino-4-thiocyano-5-nitroanthraquinone.

4. The process of preparing 1-amino-4-thiocyano-5-nitroanthraquinone which comprises monodiazotizing 5-nitro-1,4-diaminoanthraquinone and reacting the diazonium compound thus obtained with potassium thiocyanate to form 1-amino-4-thiocyano-5-nitroanthraquinone.

5. The process of preparing 1-amino-4-thiocyano-5-nitroanthraquinone which comprises monodiazotizing 5-nitro-1,4-diaminoanthraquinone, reacting the diazonium compound thus obtained with potassium thiocyanate to form 1-amino-4-thiocyano-5-nitroanthraquinone and recovering the 1-amino-4-thiocyano-5-nitroanthraquinone formed.

References Cited in the file of this patent

UNITED STATES PATENTS 2,273,966     Klein _____ Feb. 24, 1942

OTHER REFERENCES

Georgievics: "A Text Book of Dye Chemistry" (1920), page 7.

Gattermann: Chemical Abstracts, vol. 7 (1913), page 606.

Georgievics: "A Text Book of Dye Chemistry" (1920), page 255.

Degering: "An Outline of Organic Nitrogen Compounds" (1945), pages 340–341 and 546.